United States Patent

[11] 3,582,749

[72] Inventor Robert H. Wenzel
 Orange, Calif.
[21] Appl. No. 764,125
[22] Filed Oct. 1, 1968
[45] Patented June 1, 1971
[73] Assignee Textron, Inc.
 Covina, Calif.

[54] CONTROL SYSTEM FOR POSITIONING A CUTTING TOOL IN AN AUTOMATIC TURNING MACHINE FOR AUTOMATICALLY POSITIONING AND CONTROLLING THE MOVEMENT OF THE CUTTING TOOL
11 Claims, 10 Drawing Figs.

[52] U.S. Cl. .................................................. 318/571,
 318/578
[51] Int. Cl. .................................................. G05b 19/24
[50] Field of Search .................................................. 318/571,
 578

[56] References Cited
UNITED STATES PATENTS
RE25,648 9/1964 Herndon, Jr. ................. 318/28(20.160)
3,259,819 7/1966 Heiser ........................ 318/19(20.160)
3,300,696 1/1967 Fillmore et al. ............... 318/19(20.160)

Primary Examiner—Benjamin Dobeck
Attorney—Jessup & Beecher

ABSTRACT: A tracer control system is provided for use in conjunction with turning machine tools, such as horizontal lathes or vertical turret lathes. The system of the invention provides an automatic control for the cutting tool of the machine along any desired two-dimensional path, as determined by the engagement of a sensing head stylus with the edge of a flat template. The control system to be described includes unique control circuitry which permits the turning speed of the machine to increase as the cutting tool is moved towards the center of rotation, and at the same time controls the rate of movement of the cutting tool tangent to the surface of the workpiece so that constant cutting speed may be achieved with a constant chip thickness as the cutting tool traverses the workpiece.

CONTROL SYSTEM FOR POSITIONING A CUTTING TOOL IN AN AUTOMATIC TURNING MACHINE FOR AUTOMATICALLY POSITIONING AND CONTROLLING THE MOVEMENT OF THE CUTTING TOOL

The tracer control system to be described also has the unique feature in that the profiling or feed rate control servo loop of the system operates independently of the positioning servo loop for the cutting tool. This permits optimum positioning and rate control to be effectuated for variable deflections of the stylus, and it also permits the feed rate speed to be reduced to zero so that the cutting tool may be accurately positioned at its starting point on the workpiece before the actual cutting operation and movement of the cutting tool is commenced.

BACKGROUND OF THE INVENTION

Profiling or tracing control mechanisms and systems are generally known to the art, for both two-dimensional and three-dimensional control of various types of machine tools. Such control mechanisms usually include a sensing head, which, in turn, includes a pivotally mounted stylus. In the two-dimensional-type of tracing control system, for example, the sensing head may be mounted directly on the carriage of the machine tool which supports the cutting bit. Then, as the sensing head is moved into position at which its stylus engages a preselected starting point on the edge of a stationary template (mounted, for example, on the frame of the machine tool), the cutting bit is moved at the same time into its position of initial engagement with the workpiece.

The aforesaid positioning of the sensing head and cutting bit is carried out by means of a servo positioning loop which is included in the system. This positioning loop also serves to maintain the stylus in engagement with the edge of the template as the cutting operation proceeds. When the sensing head and cutting tool are in position, and the machine is actuated to turn the workpiece, the sensing head is controlled by a profiling or feed rate servo loop so that its stylus is automatically caused to follow the edge of the template. At the same time, the cutting bit is directed along a predetermined two-dimensional path with respect to the turning workpiece.

In the tracer control system of the present invention, and as mentioned above, the positioning servo loop and the profiling servo loop operate independently of one another. This, as explained, permits optimum operational characteristics to be maintained for both loops throughout the operation, and it also permits an initial setting to be made with respect to the workpiece without simultaneous tangential movement of the stylus and corresponding movement of the cutting bit.

It will be appreciated that in vertical or horizontal turning tools, the turning speed may be increased as the cutting tool approaches the axis of rotation, without any increase in the peripheral speed of the workpiece. However, if advantage is to be taken of such increase in the rotational speed, the cutting tool must be advanced at a faster rate as the axis of rotation is approached. The improved tracer system of the invention incorporates appropriate circuitry for achieving such a result. This means that with the mechanism and system of the operation, cutting operations and especially on relatively large workpieces can be speeded materially, with a constant preset chip thickness and cutting speed being maintained for all radial positions of the cutting tool with respect to the axis of rotation.

In the particular tracer control mechanism to be described herein in conjunction with a vertical turret lathe, the sensing head and cutting tool are mounted on a common carriage, as mentioned above. The carriage, in turn, is mounted on a worktable. In such a vertical turret lathe, for example, the profiling control system responds to Y-axis deflections of the stylus by the template to provide a first lead screw servocontrol so as to cause the carriage to move up or down. Such movement of the carriage imparts similar up and down movements to the cutting tool with respect to the turning workpiece, the latter being supported on the chuck of the machine.

Likewise, the profiling control system to be described responds to X-axis deflections of the stylus by the template to provide a second lead screw servocontrol which causes the carriage to move back and forth across the worktable. The latter movements of the carriage cause the cutting tool to move in or out with respect to the turning workpiece.

Therefore, the tracing control system of the present invention, in the embodiment to be described, provides a means for automatically positioning the cutting tool along any desired two-dimensional path, as determined by the edge of the template. As will be described, the template usually consists of a flat steel plate cut to the desired outline, and the edge of the plate is traced by the stylus of the sensing head, as the stylus moves around the plate, in either inside or outside of the plate. Since the sensing head bears a fixed relationship with the cutting tool, the motion of the sensing head is reflected by corresponding motions of the tool.

The template is mounted, for example, in a stationary parallel plane with respect to the motion of the tool and sensing head. The turning axis of the machine is vertical in the embodiment to be described, and the cutting tool moves in a vertical plane so that the profiling around the template is then reflected by a corresponding cut in the workpiece. The section of the finished workpiece along the turning axis corresponds to the shape of the template. The finished workpiece, therefore, is the surface of revolution of the template as rotated about its vertical axis.

The function of the sensing head in the tracer control system is to detect the edge of the template and indicate the magnitude of the resulting deflections of its stylus with respect to its stator, and also to indicate the direction in which the deflection takes place in the vertical plane. If the friction between the stylus and the template edge is sufficiently low, the stylus will always be deflected in a direction perpendicular to the tangent of the edge of the template, at each point of contact. Therefore, the direction of the tangent to the edge of the stylus may be determined by measuring the angles at which the stylus is deflected. The latter information is used to drive the stylus of the sensing head in a direction which is always tangential to the edge of the template.

In addition, the sensing head provides an indication of the magnitude of the deflection of the stylus with respect to the stator of the sensing head. The latter information is used to control the stylus deflection and maintain it constant at all times during the tracing motion of the sensing head. In the operation of a constructed embodiment of the invention, the preferred deflection is usually of the order of 10 mils, as established by a setting on the mechanism. However, the deflection may be set, for example, to any level in a range, of, for example, 5—15 mils, if so desired.

As mentioned above, a feature of the tracer control system to be described is the functional separation of the position servocontrol loop and the feed rate, or profiling, servocontrol loop. This separation is achieved, as will be described, by a signal conditioning which utilizes a combination of both direct current and alternating current summing techniques, and in which the demodulated direct current signals are remodulated to an alternating current form.

The aforesaid separation of the two servo loops assures maximum tracking compliance of the sensing head stylus with the template for optimum tracking accuracy, together with maximum feed rate stability under a wide variety of load torques on the servomotors which drive the lead screws associated with the aforesaid worktable and carriage.

The aforesaid signal conditioning in the tracer control system of the invention also permits the inclusion of the feed rage control modulator into the tracer control system. This modulator may be combined with a variable speed chuck drive control mechanism to maintain constant cutting velocity at the point of contact of the cutting tool bit with the workpiece, so that a constant chip thickness may be maintained. It might be pointed out that the variable speed chuck drive control system to be described is a Ward Leonard system. However, other types may be used, such as a mechanical variable speed device such as presently known as a "Varidrive" may be utilized with an electrically actuated speed control.

The aforesaid system of variable speed of the drive chuck, together with the maintaining of a constant chip thickness by the tracer control system of the invention, has a substantial economic advantage in that it is capable of substantially reducing the time required to process any particular workpiece. That is, the total pass time, which is the time required for the cutting tool to pass, for example, from the outer diameter to the center of a circular disc, is materially reduced. For example, in a situation in which the chuck speed or cutting radius at the occlusion point of the cutting bit with the workpiece varies in a ratio of 3 to 1 during the pass, a reduction of time required to make the pass of 40 percent would be realized. This is compared with the usual prior art method in which the chuck speed remains constant and the radial feed rate also remains constant.

In addition, the lack of an interrelated gain relationship between the position control servo loop and the rate control servo loop in the tracer control system of the invention permits the tracking of a template at zero profiling velocity, which means that the stylus is locked at a specific position or contact point on the template. This latter feature has considerable advantage in machine shop practice which requires the accurate indexing or establishment of reference points between a template and a partially finished or other workpiece which has been mounted on the chuck of the machine tool. This feature also permits the machinist to make precise relative measurements between the tool bit and workpiece with the stylus locked into a specific position on the template, and not tracking or moving along the profile of the template.

It will be appreciated as the present description proceeds that the tracer control system of the invention has a full 360° tracing capability which can be carried out in either a clockwise or counterclockwise direction with respect to the template. In addition, the system has a variable approach control feature in either direction and along either the vertical or the horizontal axis relative to the template, as will also be described.

SPECIFIC DESCRIPTION OF THE ILLUSTRATED EMBODIMENT

Figure 1:
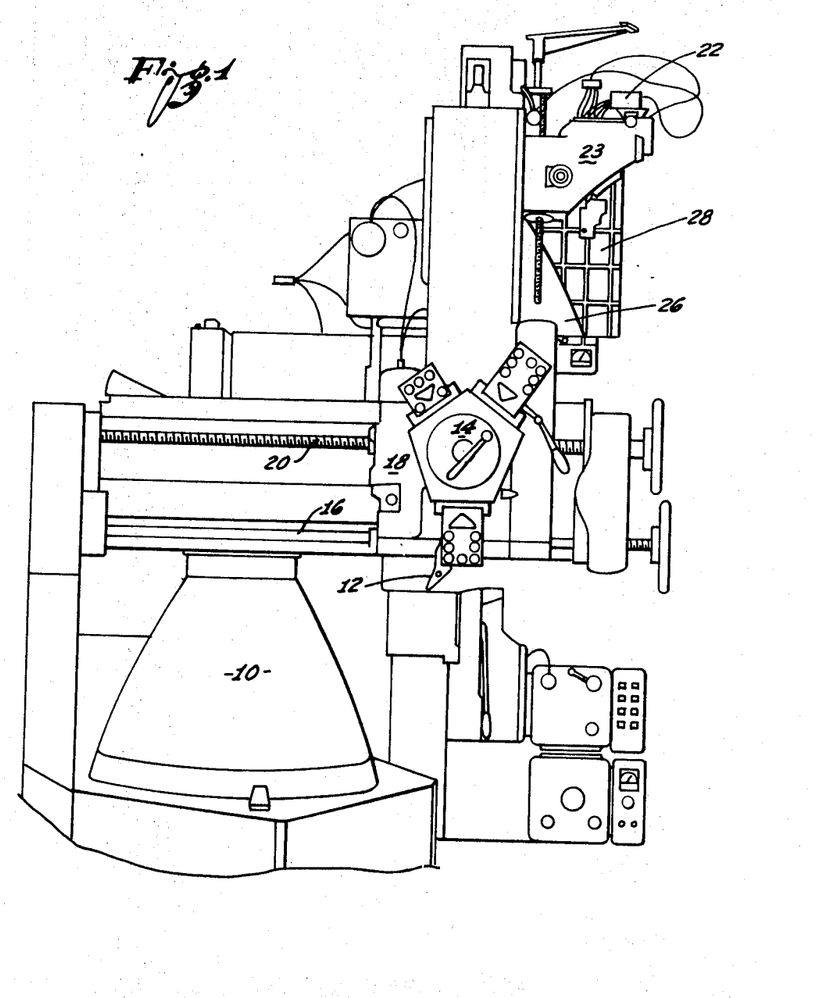
FIG. 1 is an elevation of a vertical turret lathe controlled by a sensor, which may be constructed in accordance with the concepts of the present invention.
Figure 2:
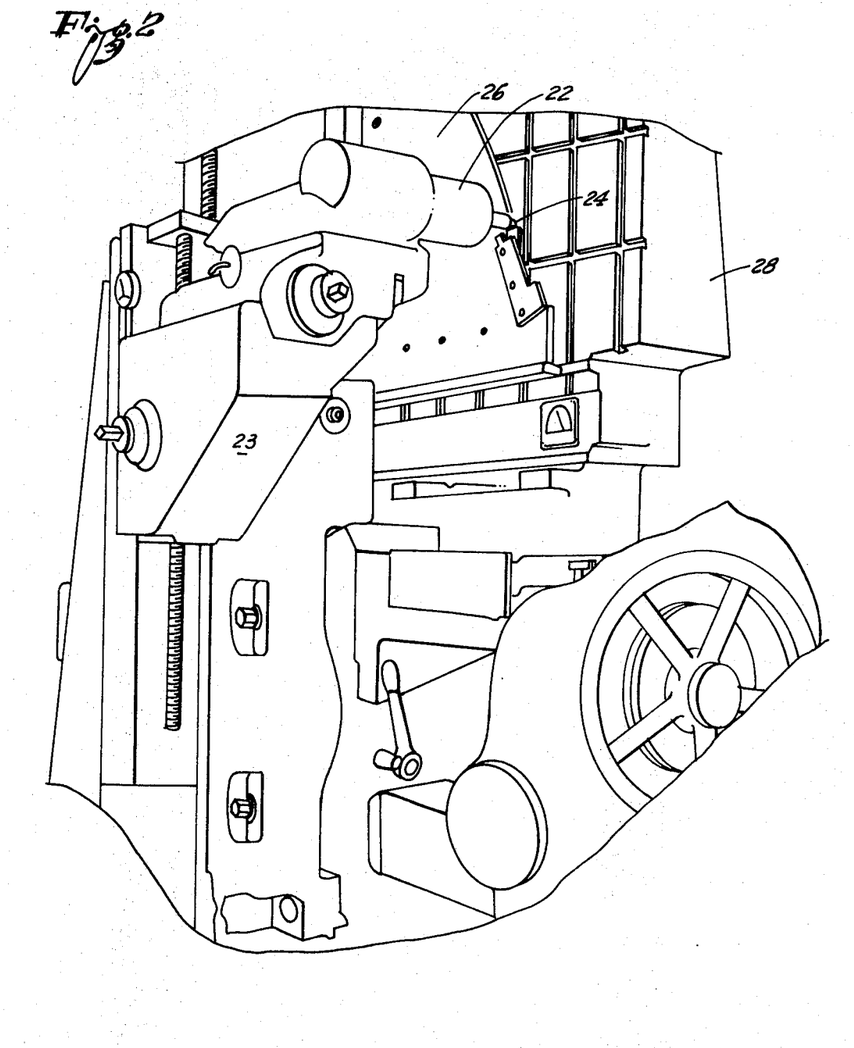
FIG. 2 is an elevation of the turret lathe of FIG. 1, taken from a slightly different angle.

In the turning machine tool, such as the turret lathe shown in FIGS. 1 and 2, a workpiece 10 is supported on a chuck in the machine and is rotated by the chuck. A cutting bit 12, on the other hand, is supported on carriage 14, which is moved up and down with respect to a worktable 18 upon the rotation of a lead screw 16 by an appropriate vertical servo drive motor, as will be described. The carriage 14 is supported on the worktable 18, and the latter is moved horizontally back and forth with respect to the frame of the machine by an appropriate horizontal servomotor which turns a lead screw 20.

Therefore, an appropriate control of the vertical servomotor causes the carriage 14, and the cutting bit 12, to move up or down in a vertical plane, and an appropriate control of the horizontal servomotor causes the cutting bit to move in or out in the aforesaid vertical plane, both with respect to the turning workpiece 10.

The sensing head 22 which is included in the tracer control system of the present invention is supported on a bracket 23 which, in turn, moves up and down with the carriage 14, and in and out with the worktable 18. Therefore, all movements of the sensing head 22 are reflected by identical movements of the cutting bit 12. The stylus 24 (FIG. 2) which extends out from the sensing head 22 engages the edge of a template 26. The template 26 is supported, for example, on an appropriate stationary support 28 which, in turn, is mounted on the frame of the machine tool.

As will be described, as the stylus 24 engages the edge of the template 26, it controls the cutting bit 12, so that it moves against the rotating workpiece 10. In this way the workpiece may be shaped into the configuration dictated by the shape of the template 26. As mentioned above, the template 26 usually consists of a flat steel plate which is cut to the desired outline. As also mentioned, the section of the finished workpiece along the rotating axis corresponding to the shape of the template, and is actually the surface of revolution of the template as rotated about the vertical axis in the particular illustrated example.

As also pointed out previously, the function of the sensing head 22 is to detect the edge of the template 26 and to control the cutting tool 12 accordingly. The sensing head bears a fixed relation with the cutting bit, as described, so that all motion of the sensing head 22 is reflected by the corresponding motion of the cutting bit.

Figure 3:
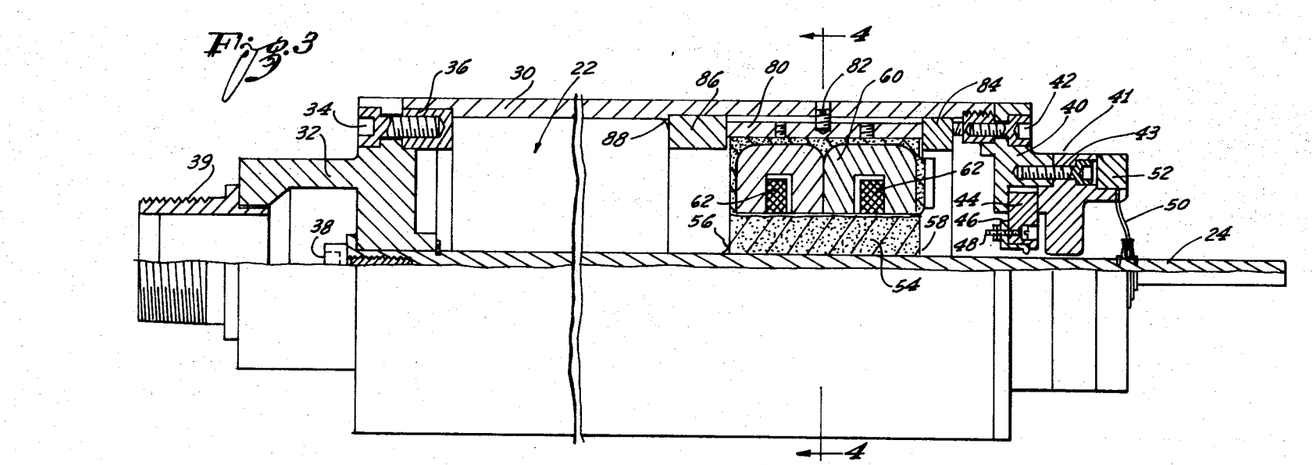
FIG. 3 is a side view, partly in section, of a sensing head which may be incorporated into the tracer control system of the invention.

The sensing head 22 may have the configuration shown in FIG. 3. That is, the sensing head may include an outer tubular housing 30. The housing 30 is closed at its left-hand end in FIG. 3 by a disclike end member 32. The end member 32 is supported on the end of the tubular housing 30 by screws such as the screw 34, the screws being threaded into bushings 36 which, in turn, are welded to a counterboard portion of the inner wall at the end of the housing 30. The end member 32 is shaped to receive a threaded connector 39, for example, so that appropriate electrical connections may be made to the interior of the housing.

The stylus 24 takes the form of a rod which, like the housing 30 and end member 32 may be composed of stainless steel. The stylus is supported at its left-hand end in the end member 32 by means, for example, of a screw 38. The stylus is rigidly supported at its left-hand end in the end member 32, and it extends along the longitudinal axis of the housing 30 to protrude out through the right-hand end of the housing. The resiliency of the stylus 24 maintains it in position along the central longitudinal axis of the housing 30. However, the stylus may be deflected against its natural resiliency in any direction throughout the entire 360° as its right-hand end engages the aforesaid template 26 of FIGS. 1 and 2.

An annular end member 40 is mounted in the opposite end of the housing 30 by means, for example, of screws 42. A further annular member 41 is mounted on the annular member 40 by means of screws, such as the screw 43, and a ring 44 is supported between the members 40 and 41. The ring 44 supports an appropriate annular stop 46 which is held by screws, such as the screw 48. A diaphragm 50 surrounds the stylus, and is held in place by a cap 52. The annular member 41 defines an opening in the end of the sensing head through which the stylus 24 protrudes.

A cylindrical armature 54 composed of ferrite, or other appropriate magnetic material, is mounted on the stylus 24 by means, for example, of welds such as the welds 56 and 58. A pair of differential transformers, as will be described, including cores such as the E-shaped core 60 and windings such as the windings 62, are mounted on the inner bore of the housing 30 in magnetically coupled relationship with the armature 54.

As will be described, the arrangement is such that when the stylus 24 is deflected in any direction, a corresponding electrical signal is generated. The electrical signal has a phase representing the direction of deflection of the stylus 24, and it has a magnitude representing the amount of deflection in the particular direction.

The actual construction of the sensing head 22 forms no part of the present invention, and any appropriate sensing head may be used to develop the required electrical signals.

Figure 4:
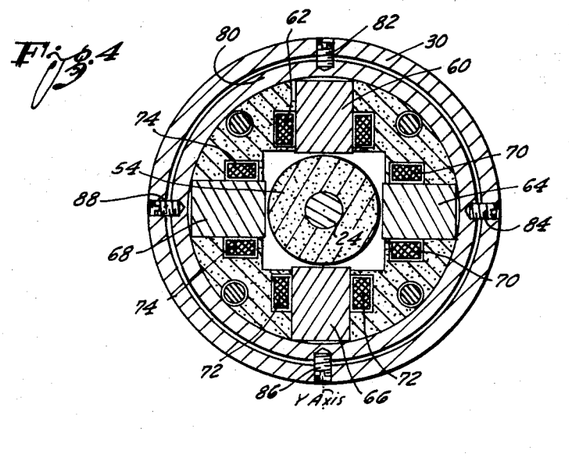
FIG. 4 is a cross sectional view of the head of FIG. 3, taken essentially along the line 4—4 of FIG. 3.

As shown in the cross-sectional view of FIG. 4, in addition to the E-shaped core 60 surrounded by its winding 62, three additional cores 64, 66 and 68 are provided in the housing 30, each displaced angularly 90° from one another. The cores 64, 66 and 68 are surrounded by corresponding windings 70, 72 and 74. The cores are supported by means of a cylindrical magnetic member 80, the cylindrical member 80 being centered within the housing 30 by means of setscrews 82, 84, 86 and 88.

As shown in FIG. 3, for example, the cylindrical member 80 is held longitudinally within the housing by the aforesaid screws, such as the screws 42 which bear against an annular member 84 which, in turn, forces the cylindrical member 80 against a further annular member 86, the latter annular member being mounted in a counterboard portion of the housing 30 and held in place by a weld such as the weld 88.

Figure 5:
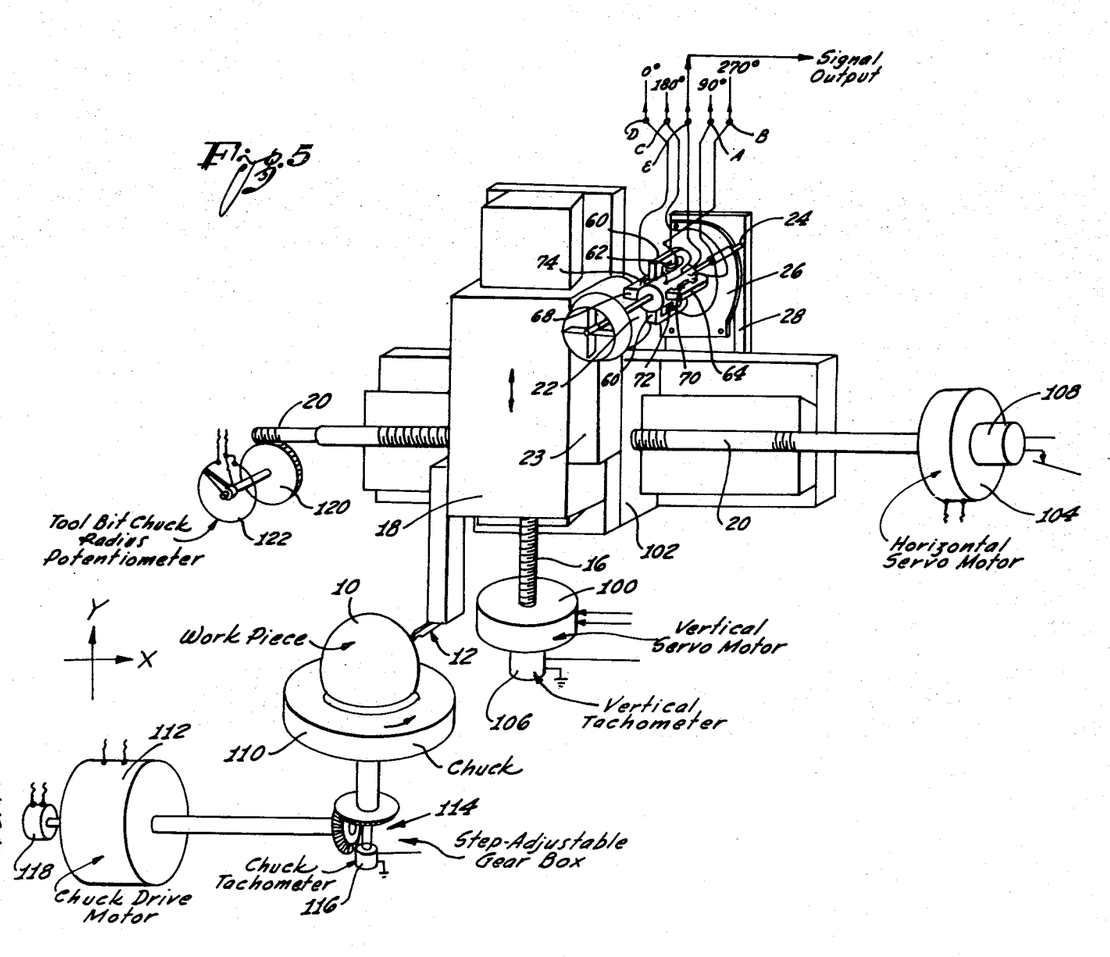
FIG. 5 is a diagrammatic representation of a machine tool having a sensing head mounted thereon, and controlled by the tracer control system of the invention.

The manner in which the sensing head 22 is supported on the machine tool of FIGS. 1 and 2 is shown diagrammatically in FIG. 5. As described above, the sensing head 22 is mounted on a support bracket 23, which, in turn, is mounted on the carriage 18 which supports the cutting bit 12. The carriage 18, together with the sensing head 22 and cutting bit 12 are moved vertically up and down by means of a vertical servomotor 100 which drives the vertical lead screw 16. The carriage 18, as described, is mounted on a worktable 102, and the worktable, together with the carriage 18, are moved horizontally by a horizontal servomotor 104 which drives the lead screw 20. Therefore, any drive by the vertical servomotor 100 causes the tool bit 12 and the sensing head 22 to move vertically with respect to the workpiece 10, whereas any drive by the horizontal servomotor 104 causes the cutting bit 12 and the sensing head 22 to move in and out with respect to the workpiece. As shown, the vertical servomotor 100 has a vertical tachometer 106 coupled thereto, whereas the horizontal servomotor 104 has a horizontal tachometer 108 coupled thereto.

The workpiece 10, as shown in FIG. 5, is supported on a chuck 110, the chuck being driven by a chuck drive motor 112. The chuck is driven by the drive motor 112 through a reduction gearing designated generally as 114. A chuck tachometer 116 is coupled to the drive shaft of the chuck, whereas an additional tachometer 118 is coupled to the drive shaft of the motor 112. A further gear 120 is driven in a worm gear relationship by the lead screw 20 as the lead screw rotates. This gear 120 is coupled to a potentiometer 122, so that the potentiometer is caused to turn as the bit 12 is moved in the X direction by the lead screw towards the center of the workpiece 10.

As will be described, four signals each displaced 90° with respect to one another are introduced to the coils of the sensing head through terminals A, B, C and D respectively. In response to these signals, the sensing head generates an output signal at the terminal E. The magnitude of the output signal represents the deflection of the stylus 24, and the phase of the output signal represents the direction of deflection of the stylus.

Figure 6:
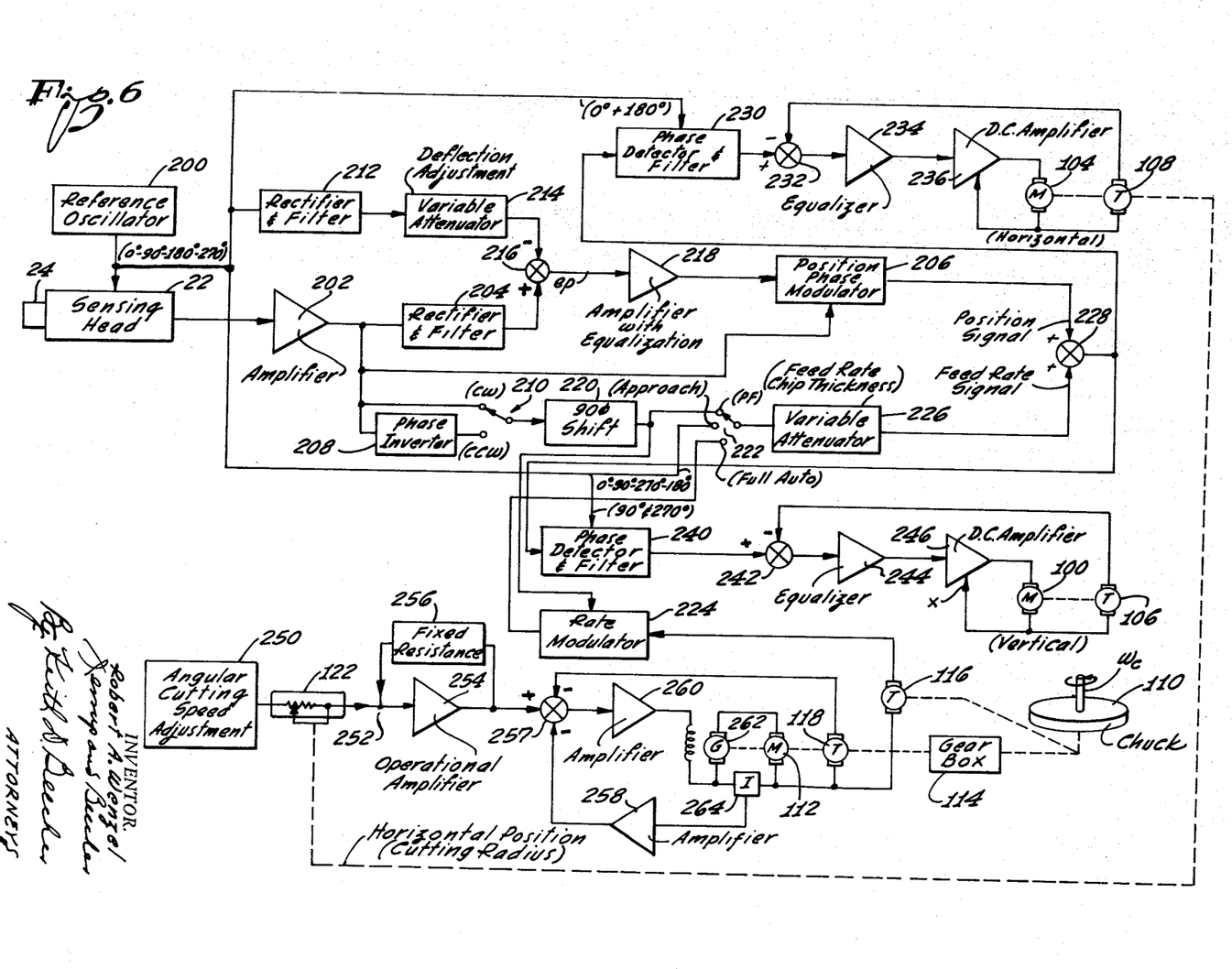
FIG. 6 is a block diagram of the tracer control system of the invention.

The basic block diagram for the system of the invention, insofar as the illustrated embodiment is concerned, is shown in FIG. 6. The block diagram of FIG. 6 includes a 2-kilocycle reference oscillator 200. This reference oscillator generates the aforesaid four signals each having a frequency of 2 kilocycles, and which are at 0°, 90°, 180° and 270° with respect to a particular reference signal. These signals may be sinusoidal, and they are applied to the sensing head 22. The output from the sensing head is applied to an amplifier 202 which, in turn, is coupled to a rectifier and filter 204, to a modulator 206, to a phase inverter 208, and to one of the terminals (CW) of a single-pole double-throw switch 210. The other terminal (CCW) of the switch 210 is connected to the output of the inverter 208.

The signals from the oscillator 200 are also applied to a rectifier and filter 212, the output of which is coupled through a variable attentuator 214 to a summing network 216. The summing network 216 also responds to the output from the rectifier and filter 204, and the output from the summing network is applied to an equalizer amplifier 218, the output of which is applied to the modulator 206.

A 90° phase-shifting network 220 is connected to the movable contact of the switch 210, and the output of the phase shifting network is connected to a terminal (P.F.) of a single-pole triple-throw switch 222. A second terminal (APPROACH) of the switch is connected back to the output of the oscillator 200, and a third terminal (FULL AUTO) of the switch is connected to a rage modulator 224. The movable contact of the switch 222 is connected to a variable attenuator 226 which, together with the output from the modulator 206 are applied to a summing network 228. The output from the summing network is applied to a phase detector and filter 230, together with the 0° and 180° signals from the oscillator 200. The output from the phase detector 230 is summed with the output from the horizontal tachometer 108 in a summing network 232, and the result is applied through an equalizer 234 to a direct current amplifier 236 which drives the horizontal servomotor 104.

The output from the summing network 228 is also applied to a phase detector and filter 240, together with the 90° and 270° signals from the reference oscillator 200. The output from the phase detector 240 is summed in a summing network 242 with the signal from the vertical tachometer 106, and the result is passed through an equalizer 244 to a direct current amplifier 246 which drives the horizontal servomotor 100. The output from the 90° phase-shifting network 220 is also applied to the rate modulator 224, as is the output from the chuck tachometer 116. The phase detectors 230 and 240 each produce a unidirectional output signal which is proportional to the product of the input signal amplitude and the cosine of the phase displacement of the input from a reference signal.

The chuck motor 112 is controlled by energy derived from a cutting angular speed adjustment circuit 250. The latter circuit being coupled through the tool bit chuck radius potentiometer 122, and into the summing point 252 of an operational amplifier 254. The output from the operational amplifier is fed back through a fixed resistance 256 to the summing point 252. The output from the operational amplifier is summed in a summing network 257 with the outputs from a current limiting amplifier 258 and from the chuck drive motor tachometer 118. The output from the summing network 257 is amplified and a proportional generator field current is provided by an amplifier 260. A constant speed motor drives the generator 262, the output of which is used to drive the main chuck drive motor 112.

Referring now to FIG. 6 for a detailed explanation of the operation of the system of the invention, it will be assumed that the template 26 is being traced by the stylus 24, and that the stylus is set to have a constant deflection of, for example, 10 mils. This deflection of the stylus is controlled by the position servo loop system which is included in the overall system of FIG. 6.

The basic carrier frequency generated by the oscillator 200 may, for example, be 2 kilocycles, as mentioned above. The oscillator supplies four signals to the sensing head 22, these signals being phased as 0°, 90°, 180° and 270° with respect to a reference, as also mentioned above. If the stylus 24 is deflected from the neutral position, the sensing head will introduce a signal to the amplifier 202 having a phase indicative of the direction of the stylus deflection and a magnitude indicative of the amount of the deflection.

In order for the stylus 24 to operate at a constant deflection, and for the deflection of the stylus to be unaffected by varying tracing speeds, the position control servo system should drive the stylus against the edge of the template in a direction perpendicular to the tangent at the particular point of contact at all times. In order to maintain the preset 10-mil deflection of the stylus, the position servo acts to move the sensing head in a direction to reduce the deflection when the deflection reaches 10 mils, and to move the sensing head 22 in a direction to increase the deflection when it is less than 10 mils.

The 0° and 180° signals from the oscillator 200 are fed to the horizontal excitation coils of the sensing head, and the 90° and 270° signals are fed to the vertical excitation coils. If the stylus is deflected from the neutral position in a horizontal direction, the output from the sensing head 22 will be either in phase with the 0° signal or the 180° signal, depending upon whether the deflection is to the left or to the right when looking at the front of the template. Likewise, if the stylus is deflected in a vertical direction with respect to the sensing head, then the resulting signal output is either in phase with the 90° signal or with the 270° signal, depending upon whether the deflection is up or down.

If the deflection of the stylus is in a direction having both vertical and horizontal components then the resulting output from the sensing head will have a magnitude proportional to the deflection, and will have a phase angle indicating the direction of the deflection. When the sensing head is moved against the edge of the template, the position servosystem will operate to maintain a 10-mil deflection of the stylus, or any other predetermined deflection as set by the attenuator 214.

The output from the sensing head has the carrier frequency of, for example, 2 kilocycles, as derived from the oscillator 200, and this output is converted to direct current in the rectifier and filter 204. The direct current output from the rectifier 204 has an amplitude proportional to the deflection of the stylus 24, and it is used, as will be described, for comparison purposes and for generation of the position servo loop error system.

The resulting direct current from the rectifier 204 is referenced against a second direct current voltage in the summing network 216, the latter direct current voltage representing the desired deflection of the stylus. The desired deflection voltage is derived by applying the output of the oscillator 200 to the rectifier and filter 212, and by setting the variable attenuator 214 to a desired setting. As mentioned above, the amplitude of the reference voltage may be such as to provide any desired deflection of the stylus in the 5—15 mil range. By referencing the oscillator output and the sensing head output in the summing network 216, the resulting error signal $e_p$ is independent of variations in oscillator voltages so that there is no need for precise and complicated voltage stabilizing circuitry in the oscillator.

The error signal $e_p$ from the summing network 216 is introduced to the operational amplifier 218. For normal operation of the system with the desired stylus deflection of, for example, 10 mils, the amplitude of the error signal $e_p$ is near zero. The operational amplifier 218 serves to provide equalization for the position servo loop, and also to provide low output impedance for utilization in the modulating portion of the system, as will be described.

The direction current voltage from the amplifier 218 is modulated with the 2 kilocycle output from the amplifier 202 by the modulator 206. Neglecting for the moment the feed rate servo loop, the output from the modulator 206 is applied through the summing network 228 to phase detectors and filters 230 and 240. Since the modulating carrier applied to the modulator 206 is the sensing head signal from the amplifier 202, and the direct current position loop error signal $e_p$ is either positive or negative depending upon whether the stylus deflection is greater or less than the desired value, the output signal from the modulator 206 has a magnitude proportional to the amplitude of the position loop error signal $e_p$, and a phase corresponding to the desired correction vector into or away from the template in a direction perpendicular to the tangent at the point of contact.

The circuits represented by the blocks 230 and 240 act as phase detectors, so that a direct current output is produced, for example, by the unit 230 having a first polarity for X-axis deflection in one direction and a second polarity for X-axis deflections in the other direction. Likewise, a direct voltage output is produced by the unit 240 having a first polarity for Y-axis deflections in the up direction, and a second polarity for Y-axis deflections in the down direction. Thus, the position error vector $e_p$ is resolved into direct current components along the X- and Y-axes.

The equalizer 234, direct current amplifier 236, motor 104 and tachometer 108 in the horizontal drive system are connected as a usual servo drive system, so that the motor 104 responds to any X-axis deflections to return the sensing head to the position in which the error voltage $e_p$ is zero. Likewise the equalizer 244, direct current amplifier 246, motor 100 and tachometer 106 are connected as a usual servosystem which returns the sensing head to the position of zero error voltage $e_p$ when the deflection of the stylus 24 has any tendency to depart from its preset value.

The phase detectors 230 and 240 for the horizontal and vertical drive of the sensing head, when fed solely from the position servo loop, as described above, always act to drive the sensing head either into or away from the edge of the template in a direction perpendicular to the tangent at the point of contact. Therefore, if the profiling, or feed rate, control servo loop, which will be explained later, is set to zero, the stylus 24 will assume a position of the desired 10-mil deflection, for example, at the point of contact, and there will be no other motion of the sensing head with respect to the template.

During the automatic tracing operation, however, a further signal is fed and summed with the output of the position modulator 206 in the summing network 228, so that components of the later signal will be fed to the phase detectors 230 and 240 to drive the sensing head in a direction tangential to the edge of the template. In this way, the stylus 24 of the sensing head is caused to trace the outline of the template, and the corresponding cutting tool 12 is caused to perform the desired cutting operation on the workpiece.

The output of the sensing head 22 is used as a source of the profiling, or tracing, signal in the rate control loop. This signal is appropriate because during normal profiling operation it is held constant for the preset deflection of the stylus, and its phase changes from time to time as the stylus follows the changing edge of the template. Therefore, the sensing head output, when shifted by either ±90° may be summed in the summing network 228 with the output from the position modulator 206 to provide appropriate commands for the horizontal and vertical drive motors 104 and 100. This serves to move the stylus at a constant velocity in a direction tangential to the edge of the template.

The speed at which the stylus moves around the template, and the corresponding feed rate of the cutting tool and resulting chip thickness removed from the workpiece may be controlled by setting the variable attenuator 226. The system is set for a clockwise movement of the stylus around the template, for example, by connecting the 90° phase shifter network 220 to the (CW) contact of the switch 210. The direction may be reversed by connecting the switch 210 to the (CCW) contact so as to interpose the phase inverter 208 into the circuit. The velocity control of the feed rate loop may be set from zero to the normal cutting rate of the machine, by adjustment of the variable attenuator 226. As mentioned above, a feature of the system of the invention is the independence of the position servo loop from the feed rate servo loop, so that by setting the variable attenuator 226 to zero feed rate, the position loop may be operated independently, so as to bring the tool into position, without any other movement.

The aforesaid control is achieved when the switch 222 is set to the (PF) position, as shown in FIG. 6. When the switch 222 is set to the (APPROACH) position, the signals from the reference oscillator 200 are applied to the horizontal and vertical servomotors 100 and 104 so as rapidly to bring the stylus 24 up against the edge of the stylus. When the engagement has been reached between the stylus and the template, a relay is actuated, as will be described, which removes the approach signal, closes the position loop, and applies a profiling rate signal derived from the phase shifted head signal, or from the chuck tachometer, depending upon the position of the mode control switch 222.

When the switch 222 is set to the (FULLY AUTOMATIC) position, the complete automatic control system including rate modulator 222 is activated. This control system provides a constant cutting speed at the tool bit and a constant chip thickness over a wide range in cutting radius and subsequent chick speed of the machine tool. This as mentioned above, permits the chuck speed to be increased as the center of rotation is approached by the cutting tool, and yet speeds up the feed rate so that a constant chip thickness may be maintained for all the varying speeds of the chuck. This is accomplished by providing a feed rate which is a selectable fraction of the instantaneous chuck speed, or of the constant tool speed.

The block 250 provides an energizing power for the chuck motor 112. This block includes an adjustment, by which the desired speed of the motor 112 may be set. The potentiometer 122 is included between the the block 250 and the operational amplifier 254. As described above, the potentiometer 122 varies with the radius of the cutting tool from the center of rotation of the chuck, so that an increasing potential is applied to the motor 112 as the cutting tool approaches the axis of rotation for increased speed of the motor.

The output from the 90° phase shifter 220, which would normally be applied directly to the variable attenuator 226 when the switch 222 is in the (MANUAL) position, is used to direction modulate the direct current rate magnitude signal from the chuck tachometer by means of the rate modulator circuit 224, when the switch 222 is in the (FULLY AUTOMATIC) position. The rate modulator output signal is a vector whose direction indicates the desired direction of tool feed and whose amplitude is proportional to chuck speed. Since feed rate is tangential to the work surface, and its velocity is proportional to chuck speed, the tool bit will advance a fixed distance for every revolution of the chuck. Application of the feed rate signal to the potentiometer 226 allows the advance of the tool for each revolution of the chuck to be adjusted to the desired chip thickness.

The drive amplifiers 236 and 246 for the direct current servomotors 104 and 100 of the horizontal and vertical lead screws may be solid-state linear bridge-type amplifiers with relatively high frequency response. This allows maximum rate loop response, the response being limited only to the servomotors and the inertia of the lead screw drives and carriage. The use of low inertia servomotors and gear drives increases the frequency response of the machine and allows the maximum position loop gain, thereby increasing the accuracy of the tracing operation.

As noted above, the automatic portion of the control system of FIG. 6 permits the speed of the chuck to be varied in accordance with the distance of the cutting tool from the axis of rotation of the chuck, and maintains the feed rate proportional to the chuck speed for constant chip thickness. The constant cutting speed feature of the chuck drive may be used without the profiling equipment and is controlled by mounting on the horizontal lead screw the 11R potentiometer 122. The output from the operational amplifier 254 provides a voltage inversely proportional to the distance of the cutting tool from the axis of rotation of the chuck, and this is used to control the speed of the chuck. The speed range is limited to approximately 4 to 1 ratio in the profiling equipment and provides approximately 40 percent reduction in the turning time for large diameter discs or cones, for example.

The purpose of the rate modulator 224 is to modulate the signal from the tachometer 116 at a 2-kilocycle rate so as to provide a sine wave output which controls the feed rate of the cutting tool. The 2-kilocycle signal is obtained from the sensing head 22 after it has been shifted 90° by the phase shifter 220, and the signal is filtered to provide a sine wave input to the variable attenuator 226, when the switch 222 is in the (FULLY AUTOMATIC) position. This feed rate signal then determines the stylus profiling motion with respect to the template, and makes the profiling speed of the stylus proportional to the speed of the chuck 110, thereby maintaining at all times a constant cutting chip thickness. This control, as mentioned above, greatly reduces the machine time for large diameter workpieces. The illustrated chuck speed amplifier is a conventional Ward Leonard rotary amplifier system with a rate loop or tachometer feedback, as shown. The output from the operational amplifier 254 produces a proportional chuck speed independent of the tool loading on the machine. In addition to the rate loop control, a current limit is used in the amplifier 258 for limiting the maximum current fed to the main chuck motor 112. This results in a torque limit at the output shaft of the main chuck drive motor to protect the gearing in the gear box 114.

If the stylus is not in position against the edge of the template there is no signal available for driving the sensing head 22. Therefore, some other means must be provided to being the stylus into contact with the edge of the template. This is accomplished, as mentioned above, by setting the switch 222 to the (APPROACH) position, so that a signal from the oscillator 200 is supplied to the servomotors 104 and 100 to bring about the desired movement of the sensing head 22 and of the cutting tool.

A further switch may be provided which can be put in any one of four positions, causing different ones of the excitation signals from the oscillator 200 to be applied to the phase detectors, or demodulators, 230 and 240, so that the sensing head and tool may be moved to the left or right, or up and down, when the stylus is not against the template. When the stylus contacts the edge of the template, the deflection increases above a certain minimal value, and appropriate detection circuitry may be provided for automatically switching the switch 220 from the (APPROACH) position to the (FULL AUTO) position for normal feed rate control by the stylus.

As mentioned above one of the novel features of the system of the present invention is the fact that the deflection position servo loop is independent of the tracing or feed rate, which allows for easy variation of tracing speed either from the output signal of the chuck tachometer 116 or the output signal from the sensing head 12 without compensating for gains in the positioning loop. For example, if the profiling rate were controlled by variations of the gain of the tachometer or rate loops on the horizontal and vertical drive, then the position loop gain would correspondingly be varied and reduced at a low cutting speed.

With the system of the present invention, the accuracy increases as the cutting speed is reduced. This is due to the fact that the inputs to the stylus are correspondingly reduced and corrections necessary to maintain the constant deflection can be made more rapidly with smaller excursions from the desired path.

Figure 7:
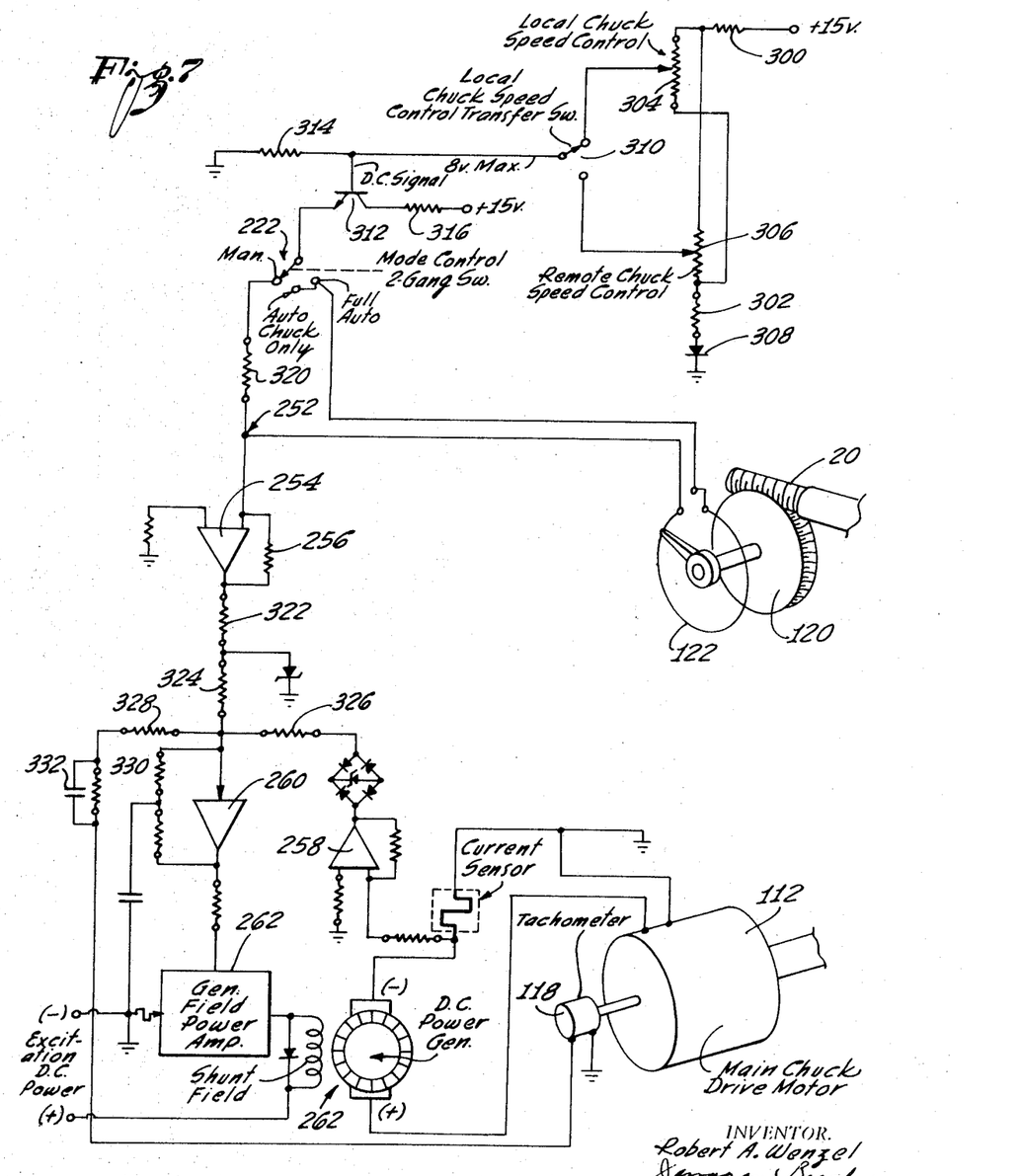
FIGS. 7—10 are more detailed representations of the various control components which make up the tracer control system of the invention.

The circuitry for controlling the chuck drive motor is shown in more detail in FIG. 7. As shown, the voltage source for exciting the motor is a 15 volt direct voltage source, and a pair of resistors 300 and 302. These resistors, in conjunction with a pair of shunt connected potentiometers 304 and 306, are connected between the positive terminal of the source and through a diode 308 to a point of reference potential or ground. The potentiometers 304 and 306 may be 20-kilohm potentiometers, and provide respectively a local chuck speed control and a remote chuck speed control. The system may be set either to the local control or to the remote control by a signal-pole, double-throw switch 310, the movable arm of which is connected to the base of an NPN transistor 312 and to a grounded resistor 314. The collector of the transistor 312 is connected through a resistor 316 to the positive terminal of the 15 volt source, and the emitter of the transistor is connected to the movable contact of the second section of the two-gang switch 222. The switch 222 may be set either to "MANUAL," "AUTO CHUCK ONLY," or to "FULLY AUTOMATIC."

When the switch 222 is set to "AUTO CHUCK ONLY," the control system of FIG. 7 operates to control the chuck speed as a function of the distance of the cutting tool from the center of rotation, and when the automatic tracing control system is not in use. When the switch 222 is set to "FULLY AUTOMATIC," the control is effective when the system is in use. Other switches are coupled to the switch 222, so as to energize or deenergize the tracing system, as the switch 222 is moved between its two contacts referred to above. When the switch is set to "MANUAL," the control system is ineffective, and the chuck speed remains constant, as set by either the control 304 or the control 306.

When the switch 222 is set to the "AUTO CHUCK ONLY" or to the "FULLY AUTOMATIC" contacts, the potentiometer 122 is effective to decrease in resistance in proportion to the distance of the cutting tool from the center of rotation, and as its movable arm is driven by the gear 120 which, as mentioned above, is in worm gear relationship with the horizontal lead screw 20.

The manual contact of the switch 222 is connected through a 47.5-kilohm resistor 320 to the circuitry of the operational amplifier 254 referred to in conjunction with FIG. 6. As described, the operational amplifier is shunted by a fixed resistance 256, which may have a resistance of 26.1 kiloohms. The output of the operational amplifier 254 is connected through a 2-kilohm resistor 322 and 47.5-kilohm resistor 324 to the input of the amplifier 260 referred to in FIG. 6. The resistor 324, together with a 10-kilohm resistor 326, and a 47.5-kilohm resistor 328 in series with a 138-kilohm resistor 330 form the summing network 257 of FIG. 6. The main chuck tachometer 118 supplies a DC signal to the summing network through a 138-kilohm resistor 330, the resistor being shunted by a 5-microfarad capacitor 332. This direction current signal, for example, may have a value of the order of 30 volts when the main chuck drive motor 112 is rotating at 1,500 r.p.m.

As mentioned above, the chuck drive motor 112 and the DC power generator 262 are connected in a usual Ward Leonard arrangement, so as to provide an appropriate speed control for the motor 112, as the potentiometer 122 varies in resistance during the automatic operation, or when the speed control potentiometers 304 or 306 are changed in setting.

Figure 8:
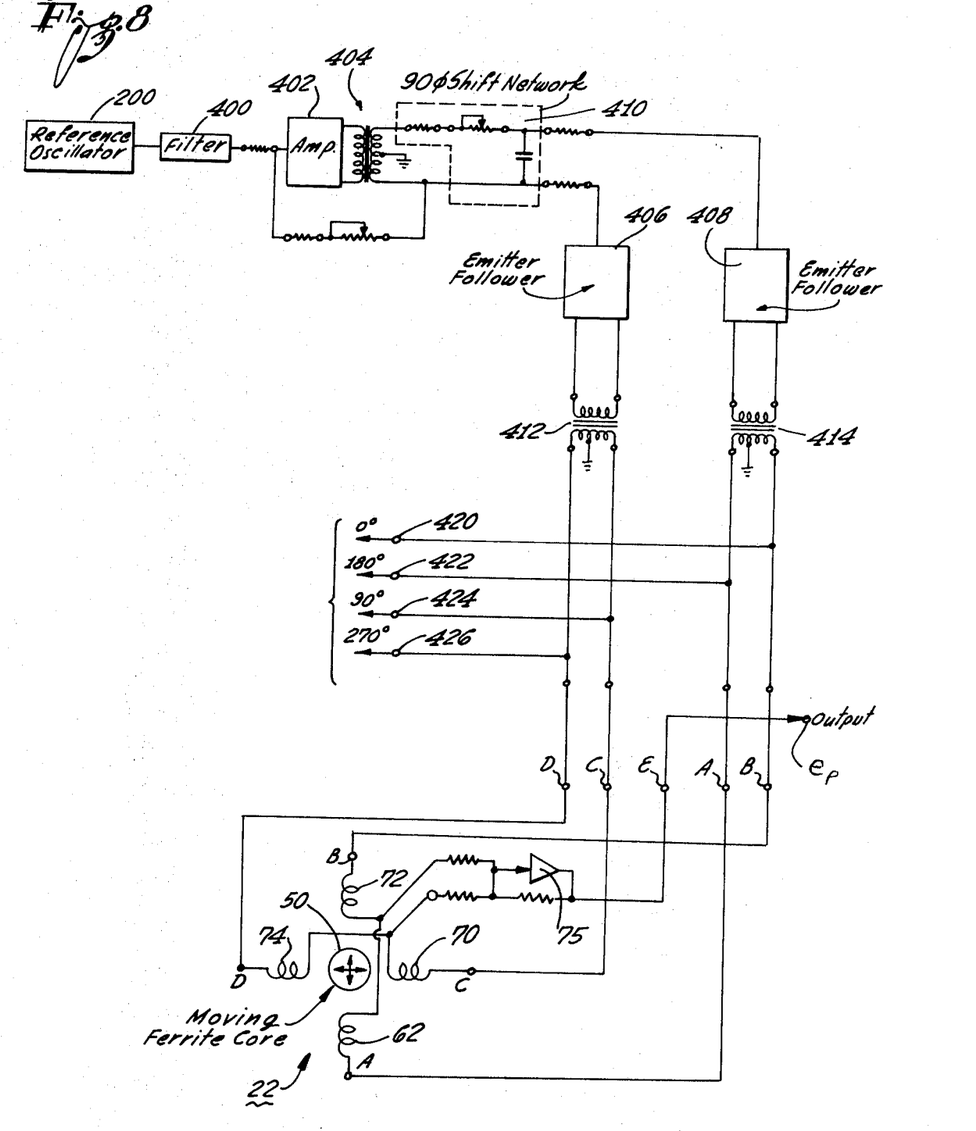

The circuitry associated with the reference oscillator 200 is shown in more detail in FIG. 8. As shown, the oscillator itself may be a 2-kilocycle crystal controlled oscillator, for example, and its output is applied through a filter 400 and amplifier 402 to the primary of a transformer 404. The center tap of the secondary winding of the transformer is grounded, and the sides of the secondary are connected to respective emitter followers 406 and 408. A 90° phase-shifting network 410 is interposed in the circuit to the emitter follower 408. The outputs of the two emitter followers are applied to respective transformers 412 and 414. The center taps of the transformers are grounded.

As shown, the transformers are connected through terminals A, B, C and D to the various coils in the sensing head 22, and also to respective output terminals 420, 422, 424 and 426 to be used in the circuit of FIG. 6, as described above. Also, the outputs from the midpoints of the windings represent the stylus deflections in the X- and Y-directions. These outputs are in quadrature electrical phase and can, therefore, be linearly summed in the amplifier 75 to produce the total deflection vector $e_p$ appearing at the terminal E of the sensing head to be used in the manner described. The sensing head may have any known configuration, and may, for example, comprise a pair of differential impedance windings connected at 90° to one another as illustrated in FIG. 8.

The moving ferrite core is moved back and forth between the ends of the various windings, so as to change their impedance respectively. The core 50 is shaped with respect to the ends of the windings, so that any quadrature motion of the core with respect to the winding produces no differential impedance change in that pair of windings and no change in potential between them. Only movements of the core towards or away from the respective windings affect the signals generated thereby.

As described above, the various signals introduced to the windings in the sensing head 22 causes the output signal at the terminal E to have a phase corresponding to the direction of deflection of the stylus 24, and an amplitude representing the magnitude of the deflection.

Figure 9:
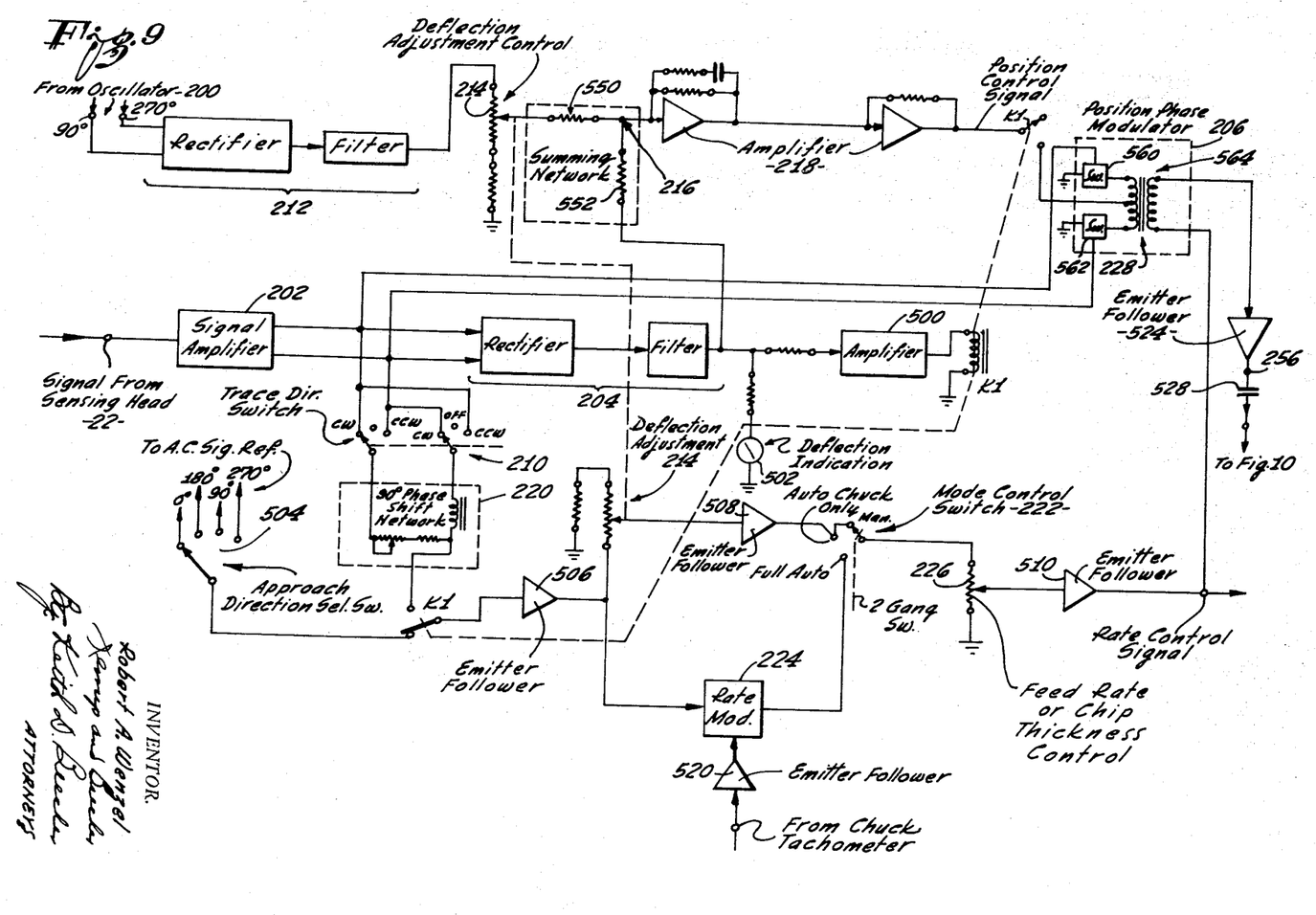

The control circuitry shown in FIG. 9 includes the rectifier and filter 204 and the rectifier and filter 212, and other components for producing the position servocontrol signal and rate servocontrol signal. As shown, the signal input amplifier 202 supplies the amplified signal from the sensing head 22 to the rectifier and filter 204, and through the double-pole, triple-throw switch 210 to the 90° phase-shifting network 220.

It might be pointed out that the block diagram of FIG. 6 represents a functional representation of the system, and that the actual diagrams of FIGS. 7—10 are somewhat different in various respects from the diagram of FIG. 6, but are functionally similar. For example, in the functional diagram of FIG. 6, the approach control for the sensing head is shown as controlled manually by setting the switch 22 to the (APPROACH) position. However, in the diagram of FIG. 9, this is achieved automatically, in that the output from the rectifier and filter 204 is applied through an amplifier 500 to the energizing coil of a relay K1. So long as the deflection of the stylus 24 is below a certain minimum as indicated, for example, by a deflection indicator 502, the relay K1 is deenergized.

When the relay K1 is deenergized, its contacts K1 at the lower left-hand corner of FIG. 9 connect the movable contact of a rotary switch 504 through an emitter follower 506 to the circuitry. This produces the rate signal through an emitter follower 508 and through a further emitter follower 510. During this condition, the position control signal is disconnected due to the fact that the K1 contact at the upper right-hand corner of the diagram is set to an open position. Then, the direction at which the sensing head and stylus approach the template can be controlled by turning the rotary switch 504 from one contact to another. As described above, the fixed contacts of the switch 504 are connected to the reference signal source to derive the various phased reference signals.

Then, when the stylus meets the edge of the template, and its deflection exceeds a predetermined minimum, the relay K1 becomes energized, so as to close it contacts. This causes the position control signal to be applied to the phase modulator 206, and it also causes the 90° phase-shifted rate control signal to be applied to the circuitry associated with the emitter followers 506, 508 and 510. The deflection adjustment 214 is connected between the emitter followers 506 and 508, and it includes a 25-kilohm potentiometer in series with a 12.5-kilohm grounded resistor, as shown. The purpose of the potentiometer 214 is to keep the rate control signal at the input to the emitter follower 508 constant as the voltages from the emitter follower 506 changes with operating deflection.

The emitter follower 508 and the rate modulator 224 are connected to respective contacts of the mode control switch 222. This mode control switch is ganged with the switch 222 in the circuit of FIG. 7, so that the system may be set to "FULLY AUTOMATIC," "AUTOMATIC CHUCK ONLY" or "MANUAL." During the "FULLY AUTOMATIC" mode, the chuck speed is controlled as a function of the distance of the cutting tool from the axis of rotation and the feed rate is also automatically controlled to maintain a constant chip thickness. During the "AUTOMATIC CHUCK ONLY" only the chuck speed is controlled automatically; and during the "MANUAL" mode, the chuck speed is held constant.

The output from the chuck tachometer 118 of FIG. 6 is passed through an emitter follower 520 to the rate modulator 224 which is connected between the emitter follower 506 and the "FULLY AUTOMATIC" contact of the mode control switch 222.

The attenuator 226 of FIG. 6, which adjusts the feed rate of the system when in the "MANUAL" or "CHUCK ONLY" positions, and adjusts the chip thickness when in "FULLY AUTOMATIC," is shown in FIG. 9 as a 20-kilohm potentiometer which is connected between the movable contact of the mode control switch 222 and ground. The summing network 228 of FIG. 6 is included in the position phase modulator 206 in FIG. 9, and the resulting composite output is fed through an emitter follower 524 to an output terminal 256. The resulting output is coupled through a capacitor 528 to the demodulator and filter 230 and demodulator and filter 240, these units being shown in more detail in FIG. 10.

The deflection adjustment 214 is also shown as a 25-kilohm potentiometer in series with a grounded 12.5-kilohm resistor. This latter potentiometer is interposed between the rectifier and filter 212 and the summing network 216. The summing network is composed of a 133-kilohm resistor 550 which is connected to the movable contact of the potentiometer and to the input of the amplifier 218, and 200-kilohm resistor 552 which is connected to the output of the rectifier and filter 204. The potentiometers in the deflection adjustment control circuit 214 are ganged together, so that whenever the circuit is set for a different deflection adjustment of the stylus 24 by the top potentiometer, a compensating adjustment is made in the circuit gain to maintain a constant feed rate signal into the rate servos which is derived from the changing deflection signal. This gain compensation is made by the lower potentiometer.

The position phase modulator 206 includes usual field-effect transistor switching stages 560 and 562. The servocontrols respond to the signals from the amplifier 202 and to the DC deflection signal from the amplifier 218, when the relay K1 contacts are closed, to provide the position control signal at the primary of the transformer 564, the transformer secondary serving as the referencing network 228, so that the composite position signal and feed rate signal may be applied to the emitter follower 524 for application to the phase detectors 230 and 240 of FIG. 10.

Figure 10:
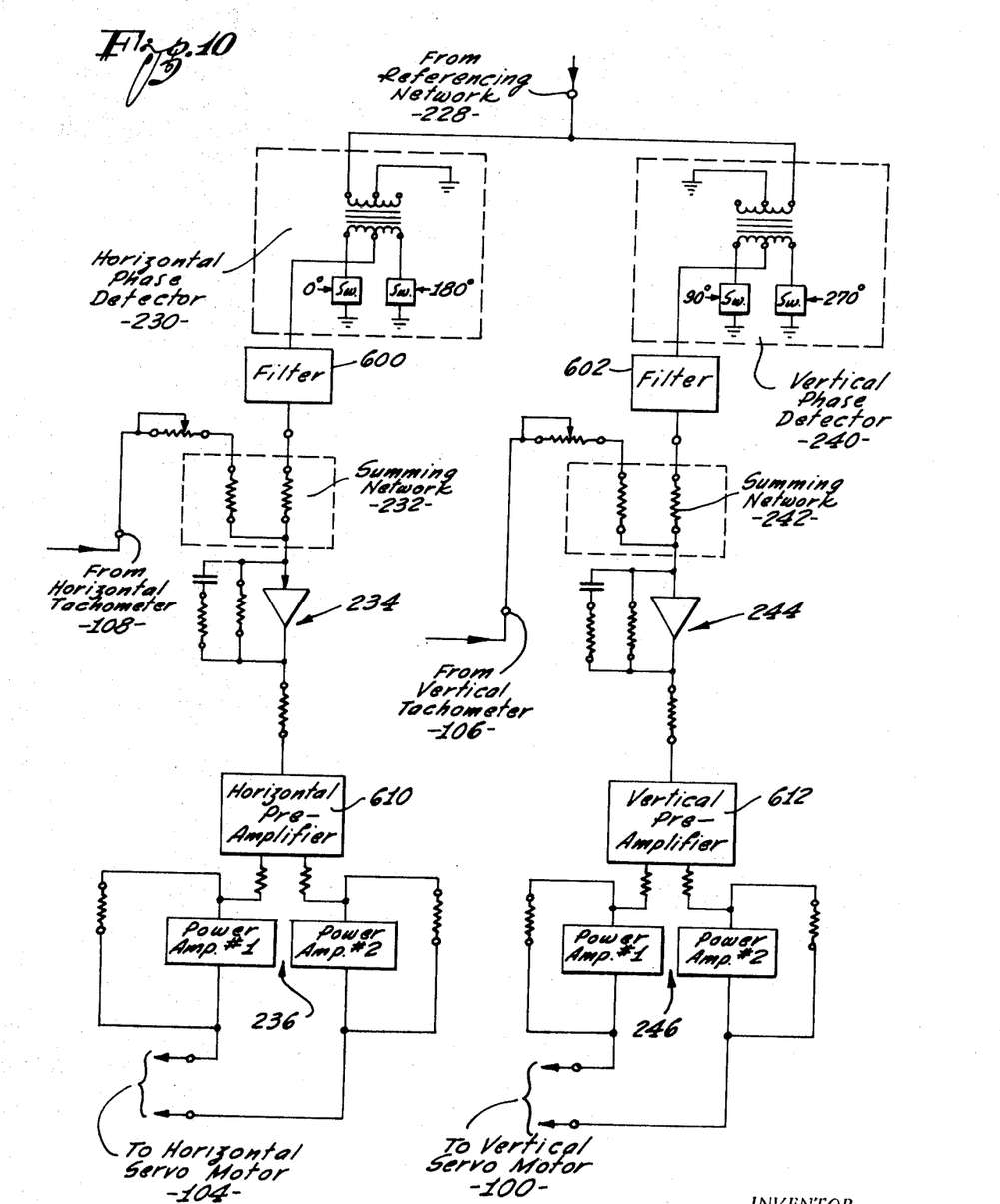

The signal from the referencing network 228 of FIG. 10 is applied to the horizontal and vertical phase detectors 230 and 240. The horizontal phase detector 230 responds to the 0° and 180° signals from the reference source to produce the horizontal deflection signal, as mentioned above, the signal being filtered in a filter 600 and applied to the summing network 232. Likewise, the vertical phase detector 240 responds to the 90° and 270° reference signals from the reference oscillator, and supplies the vertical servocontrol signals through a filter 602 to the summing network 242.

The composition of the phase detectors 230 and 240 may be of any known type, and a detailed description of these circuits is believed to be unnecessary. The outputs from the filters 600 and 602 are applied to the summing networks 232 and 242, and are respectively summed therein with the signals from the horizontal tachometer 108 and vertical tachometer 106, as described above. The resulting rate error signals from the summing networks 232 and 242 are applied through the respective equalizer amplifiers 234 and 244, and through respective preamplifiers 610 and 612 to the respective direct current power amplifier 236 and 246. The servo circuitry involved is in itself known, and a more detailed description of the circuitry is believed to be unnecessary. As described above, the outputs from the power amplifiers 236 and 246 are used to control the respective horizontal servomotor 104 and vertical servomotor 100.

The invention provides, therefore, an improved tracer control system which involves a positioning servo loop for maintaining the stylus in position against the edge of the template, and with the proper preset deflection of the stylus; and which also includes a rate control servo loop which operates to move the stylus around the template. Both loops cooperate to produce corresponding movements of the cutting tool which is mechanically coupled to the sensing head.

As mentioned above, the system of the invention is advantageous in that the position control servo loop is independent of the rate control servo loop, which permits both loops to operate at maximum efficiency at all times, and also which permits independent positioning of the stylus and cutting tool without concomitant feed movement thereof.

The tracer control system of the present invention is also advantageous in that in incorporates a variable rate control, so that the workpiece may be driven at different speeds, while at the same time maintaining a constant chip thickness. This means that the tooling operation performed by the machine proceeds at all times at optimum speed, and at the maximum chip thickness regardless of speed.

It will be appreciated, of course, that although a particular embodiment of the invention has been described herein, modifications may be made. It is intended in the following claims to cover all the modifications which fall within the spirit and scope of the invention.

What I claim is:

1. In a tracer control system for a machine tool which includes a machine component reciprocally movable along a pair of angularly related axes for processing a workpiece, and which includes a chuck rotatable about a particular axis for rotatably supporting said workpiece, said machine tool further including first and second motors for moving said component along said axes, and a third motor for driving said chuck, said control system including a sensing head mechanically coupled to said machine component to be movable therewith; said sensing head including a stylus deflectable in all directions in a selected plane, and said stylus being adapted to engage the edge of a template supported in said plane; the combination of: a source of signals coupled to said sensing head for supplying thereto a first pair of opposite phased reference signals and a second pair of oppositely phased reference signals phase displaced with respect to said first pair, said reference signals causing said sensing head to generate an output signal having a phase representative of the direction of deflection of said stylus in said plane and an amplitude representative of the magnitude of such displacement; first rectifier circuit means coupled to said source for producing a first unidirectional signal representative of the amplitude of the signals from said source; second rectifier circuit means coupled to said sensing head for producing a second unidirectional signal representative of the amplitude of said output from said sensing head; summing circuit means coupled to said first and second rectifier circuit means; and utilization circuit means coupled to said summing circuit means for utilizing the output therefrom to control said first and second motors.

2. The tracer control system defined in claim 1, and which includes adjustable attenuator means interposed between said first rectifier means and said summing network to provide a deflection control for said stylus.

3. The tracer control system defined in claim 1, and which includes phase modulator means coupled to said summing circuit means and to said sensing head, and responsive to the outputs therefrom to provide a position control servo signal for said utilization circuit means.

4. The tracer control system defined in claim 3, and which includes a 90° phase shifting network coupled to said sensing head and responsive to said output signal to provide a feed rate control signal 90° displaced in phase with respect thereto; and further summing circuit means coupled to said phase modulator circuit and to said phase-shifting network for supplying a position servo signal and feed rate servo signal to said utilization circuit means.

5. The tracer control system defined in claim 1, and which includes a source of exciting power for said third motor; and variable attenuator means interposed between said source and said third motor and controlled by the movement of said component along one of the aforesaid axes to control the speed of said chuck as a function of the distance of said component from the axis of rotation of said chuck.

6. The tracer control system defined in claim 5, and which includes a lead screw coupled to said first motor to control the movement of said component along said one axis, and in which said variable attenuator means is mechanically coupled to said lead screw.

7. The tracer control system defined in claim 5, and which includes first circuitry including a 90° phase shifter coupled to said sensing head and responsive to said output signal therefrom for developing a feed rate signal for said utilization circuit means to control the rate at which the said stylus proceeds around the template and the rate at which said component processes said workpiece; tachometer means coupled to said chuck for developing a signal representative of the rotational speed of said chuck; and further circuitry coupled to said tachometer means and to said first circuitry for controlling said feed rate signal as a function of the rotational speed of said chuck.

8. The tracer control system defined in claim 7, and which includes variable attenuator means included in said first circuitry for establishing the amplitude of said feed rate signal.

9. The tracer control system defined in claim 7, in which said further circuitry includes a rate modulator responsive to the output of said chuck tachometer means for controlling the amplitude of said feed rate signal, and responsive to the phase of the output of said phase shifting network for controlling the direction of said feed rate signal.

10. The tracer control system defined in claim 1, in which said utilization circuit means includes first servo circuitry coupled to said first motor and second servo circuitry coupled to said second motor.

11. The tracer control system defined in claim 10 in which said utilization circuit means includes a first phase detector coupled to said first servo circuitry and a second phase detector coupled to said second servo circuitry, each of said phase detectors producing a unidirectional output signal proportional to the product of the amplitude of the input signal applied thereto and the cosine of the phase angle therebetween and a predetermined reference signal, said first servo circuitry being responsive to said first pair of oppositely phase reference signals, and said second servo circuitry being responsive to said second pair of oppositely phase reference signals.